United States Patent
Tajiri et al.

(10) Patent No.: US 11,701,913 B2
(45) Date of Patent: Jul. 18, 2023

(54) LAYERED BODY HAVING POROUS LAYER, AND INKJET PAPER

(71) Applicant: YUPO CORPORATION, Tokyo (JP)

(72) Inventors: Hirokazu Tajiri, Ibaraki (JP); Daisuke Kikuchi, Ibaraki (JP); Takahiro Zama, Ibaraki (JP)

(73) Assignee: YUPO CORPORATION, Tokyo (JP)

( * ) Notice: Subject to any disclaimer, the term of this patent is extended or adjusted under 35 U.S.C. 154(b) by 0 days.

(21) Appl. No.: 17/923,047

(22) PCT Filed: May 24, 2021

(86) PCT No.: PCT/JP2021/019587
§ 371 (c)(1),
(2) Date: Nov. 3, 2022

(87) PCT Pub. No.: WO2021/241489
PCT Pub. Date: Dec. 2, 2021

(65) Prior Publication Data
US 2023/0158823 A1 May 25, 2023

(30) Foreign Application Priority Data

May 25, 2020 (JP) .................................. 2020-090316
May 25, 2020 (JP) .................................. 2020-090469

(51) Int. Cl.
*B41M 5/50* (2006.01)
*B41M 5/52* (2006.01)
(Continued)

(52) U.S. Cl.
CPC ........... *B41M 5/5254* (2013.01); *B32B 27/08* (2013.01); *B32B 27/20* (2013.01); *B32B 27/32* (2013.01);
(Continued)

(58) Field of Classification Search
CPC .. B41M 5/5254; B41M 5/506; B41M 5/5218; B41M 5/5245; B32B 27/08; B32B 27/20;
(Continued)

(56) References Cited

U.S. PATENT DOCUMENTS 9,302,525 B2   4/2016   Oguri et al.
9,475,330 B2   10/2016  Zama et al.
(Continued)

FOREIGN PATENT DOCUMENTS

JP   2000-247016 A   9/2000
JP   2001-151918 A   6/2001
(Continued)

OTHER PUBLICATIONS

JIS P 8140:1998 (Year: 1998).*
(Continued)

*Primary Examiner* — Betelhem Shewareged
(74) *Attorney, Agent, or Firm* — Greenblum & Bernstein, P.L.C.

(57) ABSTRACT

Provided is a laminate having a porous layer that can ensure the drying property of a printing ink and can also be produced with less gum residue generated. A laminate comprising a substrate layer (A) and a porous layer (B), wherein the porous layer (B) comprises a thermoplastic resin and a filler, the filler comprises a filler having a hydrophobized surface, as a part thereof, and the porous layer (B) has a liquid-absorptive capacity of 10 to 40 cc/m² as measured in accordance with JIS P 8140:1998 with a 70 mass % ethanol aqueous solution.

14 Claims, 2 Drawing Sheets

(51) Int. Cl.
  *B32B 27/32*    (2006.01)
  *B32B 27/20*    (2006.01)
  *B32B 27/08*    (2006.01)
(52) U.S. Cl.
  CPC .......... *B41M 5/506* (2013.01); *B41M 5/5218* (2013.01); *B41M 5/5245* (2013.01); *B32B 2250/242* (2013.01); *B32B 2255/10* (2013.01); *B32B 2255/26* (2013.01); *B32B 2264/104* (2013.01); *B32B 2270/00* (2013.01); *B32B 2307/718* (2013.01); *B32B 2307/726* (2013.01); *B32B 2307/75* (2013.01)
(58) Field of Classification Search
  CPC .............. B32B 27/32; B32B 2250/242; B32B 2255/10; B32B 2255/26; B32B 2264/104; B32B 2270/00; B32B 2307/718; B32B 2307/726; B32B 2307/75
  USPC ...................................................... 428/32.36
  See application file for complete search history.

(56) References Cited

U.S. PATENT DOCUMENTS

| | | | |
|---|---|---|---|
| 10,669,387 B2 | 6/2020 | Sumi | |
| 2002/0118296 A1* | 8/2002 | Schwab | ............. G01N 33/6893 348/E7.015 |
| 2003/0072935 A1* | 4/2003 | Iwasa | ......................... C08J 5/18 428/305.5 |
| 2012/0308799 A1* | 12/2012 | Yamaguchi | ............... B32B 5/26 252/194 |
| 2015/0174937 A1 | 6/2015 | Oguri et al. | |
| 2015/0266327 A1 | 9/2015 | Zania et al. | |
| 2015/0353695 A1 | 12/2015 | Sumi | |

FOREIGN PATENT DOCUMENTS

| | | |
|---|---|---|
| JP | 2012-92213 A | 5/2012 |
| JP | 2015-120289 A | 7/2015 |
| JP | 2019-188663 A | 10/2019 |
| WO | 2014/087670 A1 | 6/2014 |
| WO | 2014/109267 A1 | 7/2014 |

OTHER PUBLICATIONS

International Search Report and Written Opinion of the International Searching Authority issued in International Patent Application No. PCT/JP2021/019587, dated Aug. 3, 2021, along with an English translation thereof.

International Preliminary Report on Patentability issued in International Patent Application No. PCT/JP2021/019587, dated Nov. 17, 2022, along with an English translation thereof.

* cited by examiner

[Fig. 1]
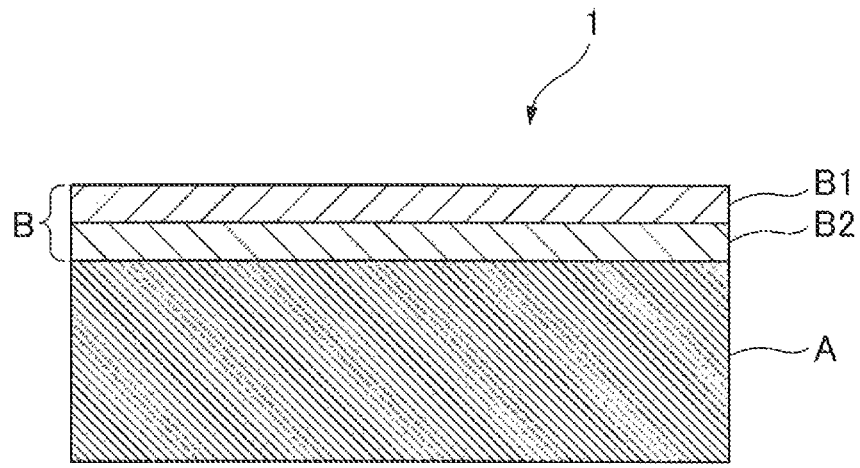
[Fig. 2]
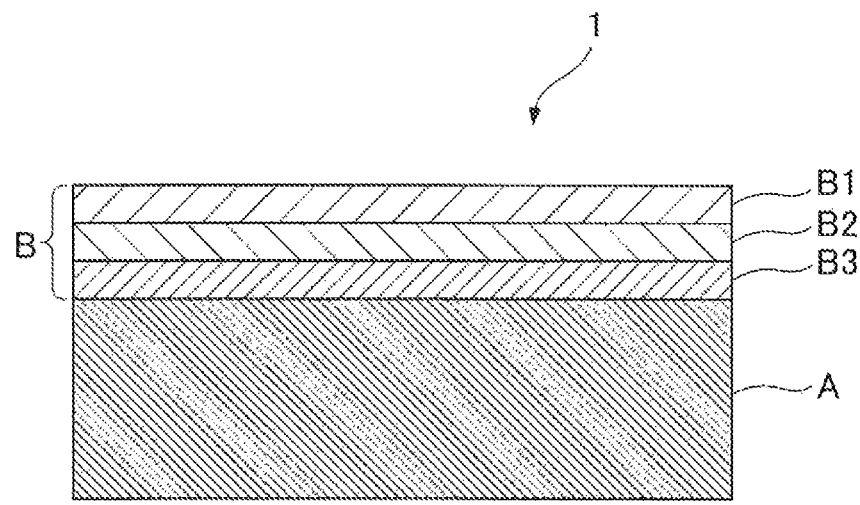

[Fig. 3]
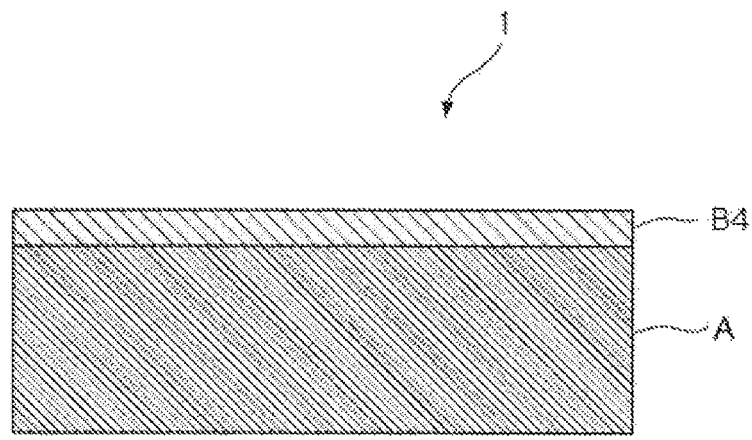

LAYERED BODY HAVING POROUS LAYER, AND INKJET PAPER

TECHNICAL FIELD

The present invention relates to a laminate having a porous layer, and ink-jet printable paper.

BACKGROUND ART

Regarding providing a printable layer for a printable medium, suggested is a printable medium including a laminate having a porous layer, wherein the porous layer is formed by stretching a resin composition including a large amount of an inorganic fine powder and serves as the surface of the printable medium, in view of enhancing the drying property of a printing ink (see, for example, Patent Literature 1).

CITATION LIST

Patent Literature

Patent Literature 1: JP 2012-92213 A

SUMMARY OF INVENTION

Technical Problem

However, when the resin composition including a large amount of a fine powder is extruded and subjected to stretching process to thereby form a porous layer as described in Patent Literature 1, agglomerations of the fine powder or the like (gum residues) are unfortunately adhered to the lip of the extruder with time in extrusion of the resin composition. If the gum residues are generated, periodic cleaning is needed, which leads to issues of the production process, including cost increase.

Accordingly, an object of the present invention is to provide a laminate having a porous layer that can ensure the drying property of a printing ink and also can be produced with less gum residues generated, as a printable medium to solve the above-described problems.

Solution to Problem

As a result of earnest studies by the present inventors to solve the above problems, they have found that the above-described problems can be solved by a laminate that has a porous layer containing a filler having a hydrophobized surface and another filler that has not undergone any surface treatment and also has a liquid-absorptive capacity within a specific range as measured with a 70 mass % ethanol aqueous solution.

Specifically, the present invention is as follows.
[1] A laminate comprising a substrate layer (A) and a porous layer (B),
wherein
the porous layer (B) comprises a thermoplastic resin and a filler,
the filler comprises a filler having a hydrophobized surface, as a part thereof, and
the porous layer (B) has a liquid-absorptive capacity of 10 to 40 cc/m² as measured in accordance with JIS P 8140:1998 with a 70 mass % ethanol aqueous solution.
[2] The laminate according to [1], wherein the filler having a hydrophobized surface is inorganic particles or organic particles having a surface treated with paraffin or a fatty acid having 12 to 22 carbon atoms or a salt thereof.
[3] The laminate according to [1] or [2], wherein the porous layer (B) has a first porous sub-layer (B1) and a second porous sub-layer (B2),
the substrate layer (A), the second porous sub-layer (B2), and the first porous sub-layer (B1) are layered in this order,
a content of a whole of the filler in the first porous sub-layer (B1), $C_{W1}$ (mass %), and a content of the filler having a hydrophobized surface in the first porous sub-layer (B1), $C_{H1}$ (mass %), satisfy an expression (a1) and an expression (b1) below, and
a content of a whole of the filler in the second porous sub-layer (B2), $C_{W2}$ (mass %), and a content of the filler having a hydrophobized surface in the second porous sub-layer (B2), $C_{H2}$ (mass %), satisfy an expression (a2) and an expression (b2) below.

$$50 \leq C_{W1} \leq 75 \quad (a1)$$

$$30 \leq C_{H1} \leq 75 \quad (b1)$$

$$50 \leq C_{W2} \leq 75 \quad (a2)$$

$$0 \leq C_{H2} \leq 15 \quad (b2)$$

[4] The laminate according to [3], wherein the first porous sub-layer (B1) has a grammage of 0.5 to 10 g/m².
[5] The laminate according to [3] or [4], wherein the second porous sub-layer (B2) has a grammage of 4 g/m² or more.
[6] The laminate according to any one of [3] to [5], wherein the thermoplastic resin contained in the porous layer (B) comprises a propylene-based polymer.
[7] The laminate according to [6], wherein the thermoplastic resin contained in the porous layer (B) further comprises an ethylene-based polymer and an acid-modified polypropylene.
[8] The laminate according to any one of [3] to [7], wherein the porous layer (B) further has a formation-supporting layer (B3), and
the substrate layer (A), the formation-supporting layer (B3), the second porous sub-layer (B2), and the first porous sub-layer (B1) are layered in this order.
[9] The laminate according to [1] or [2], wherein the porous layer (B) is a porous layer (B4) satisfying expressions (a4), (b4), and (c4) below:

$$50 < C_W \leq 75 \quad (a4)$$

$$30 \leq C_H \quad (b4)$$

$$C_H \leq 4C_W/5 \quad (c4)$$

wherein $C_W$ represents a content (mass %) of a whole of the filler in the porous layer (B4), and $C_H$ represents a content (mass %) of the filler having a hydrophobized surface in the porous layer (B4).
[10] The laminate according to [9], wherein the thermoplastic resin contained in the porous layer (B4) comprises a propylene-based polymer.
[11] The laminate according to [9] or [10], wherein the thermoplastic resin contained in the porous layer (B4) further comprises an ethylene-based polymer and an acid-modified polypropylene.
[12] The laminate according to any one of [1] to [11], wherein the porous layer (B) is a layer formed through an extrusion process.
[13] The laminate according to any one of [1] to [12], wherein the laminate has a coating layer comprising a cationic polymer on a surface of the porous layer (B).

[14] Ink-jet printable paper comprising the laminate according to any one of [1] to [13].

Advantageous Effects of Invention

The present invention can provide a laminate having a porous layer that can ensure the drying property of a printing ink and also can be produced with less gum residues generated.

BRIEF DESCRIPTION OF DRAWINGS

FIG. 1 is a cross-sectional view illustrating an example of the configuration of the laminate according to the present embodiment.

FIG. 2 is a cross-sectional view illustrating another example of the configuration of the laminate according to the present embodiment.

FIG. 3 is a cross-sectional view illustrating still another example of the configuration of the laminate according to the present embodiment.

DESCRIPTION OF EMBODIMENTS

The laminate and the ink-jet printable paper having the laminate of the present invention will be described below in detail. However, the descriptions for the constitutional features disclosed hereinbelow are illustrative (typical examples) for embodiments of the present invention, and the invention is not limited to the contents of these.

In descriptions hereinbelow, the recitation "(meth)acrylate" indicates both acrylate and methacrylate. The same also applies mutatis mutandis to recitations for (meth)acrylate derivatives and the like. The recitation "porous layer (B)" indicates any of or all of the porous layers in the present invention, including the first porous sub-layer (B1), the second porous sub-layer (B2), the porous layer (B4), and if any, the formation-supporting layer (B3).

[Laminate]

The laminate of the present invention includes the substrate layer (A) and the porous layer (B). The porous layer (B) contains a thermoplastic resin and a filler, and the filler contains a filler having a hydrophobized surface, as a part thereof. In addition, the porous layer (B) has a liquid-absorptive capacity of 10 to 40 $cc/m^2$ as measured in accordance with JIS P 8140:1998 with a 70 mass % ethanol aqueous solution.

Since the liquid-absorptive capacity is 10 $cc/m^2$ or more, the drying property of a printing ink can be ensured. Since the liquid-absorptive capacity is 40 $cc/m^2$ or less, the strength required of a laminate is easily obtained.

Since a filler having a hydrophobized surface is used as a part the filler, generation of gum residues can be suppressed upon production while the drying property of a printing ink is ensured.

The liquid-absorptive capacity can be measured in accordance with JIS P 8140:1998 with a 70 mass % ethanol aqueous solution.

The filler having a hydrophobized surface is preferably inorganic particles or organic particles having a surface treated with paraffin or a fatty acid having 12 to 22 carbon atoms or a salt thereof. The porous layer (B) may be a single layer or multi-layered.

(Substrate Layer (A))

The substrate layer can impart a strength (body) to the laminate. As the substrate layer, a resin film including a thermoplastic resin having an excellent mechanical strength can be preferably used.

<Thermoplastic Resin>

Examples of the thermoplastic resin used for the substrate layer include an olefin-based polymer, a polyamide resin, a polyester resin, a polycarbonate resin, a polystyrene resin, a poly(meth)acrylate resin, a polyvinylchloride resin, and a mixed resin thereof. Among these, an olefin-based polymer is preferable in view of water resistance and solvent resistance. The same kind of thermoplastic resin as that used for the porous layer is preferably used, since it brings about excellent adhesiveness to the porous layer to improve the durability of the thermoplastic resin film as a laminate.

(Porous Layer (B))

The porous layer (B) contains a thermoplastic resin and a filler, and the filler contains a filler having a hydrophobized surface, as a part thereof. The remainder of the filler, excluding the filler having a hydrophobized surface, is not limited as long as it is a filler having a surface that has been not hydrophobized. The remainder of the filler is preferably a filler that has not undergone any particular surface treatment, that is, a non-treated filler.

<Thermoplastic Resin>

Examples of the thermoplastic resin used for the porous layer include an olefin-based polymer, polyamide, polyester, polycarbonate, polystyrene, poly(meth)acrylate, polyvinyl chloride, and a mixed resin thereof. Among these, the olefin-based polymer is preferable in view of water resistance and solvent resistance.

<Filler>

Examples of the filler used for the porous layer (B) include inorganic particles and organic particles. Inorganic particles are particularly preferable.

Inorganic particles and organic particles each may be used singly or in combination. When a thermoplastic resin film containing a filler is stretched, many fine pores each having a particle as a nucleus can be formed in the thermoplastic resin film so that a porous layer having many pores formed can be obtained.

<<Inorganic Particles>>

Examples of the inorganic particles used for the porous layer (B) include, but not particularly limited to, heavy calcium carbonate, light calcium carbonate, calcined clay, talc, titanium oxide, barium sulfate, alumina, silica, zinc oxide, zeolite, mica, glass fiber, and hollow glass beads. Among others, heavy calcium carbonate, calcined clay, diatomaceous earth, and the like are preferable because these are inexpensive and likely to form many pores by stretching the resin composition for forming a porous layer to thereby easily control the porosity. Particularly, heavy calcium carbonate or light calcium carbonate are preferable because the average particle size or particle size distribution thereof is easily adjusted to fall within a range for easily forming pores. The above-described inorganic particles can be used singly or in combinations of two or more thereof.

<<Organic Particles>>

The organic particles used for the porous layer (B) are not particularly limited, and preferably organic particles that are not incompatible with the above-described thermoplastic resin, has a higher melting point or glass transition temperature than that of the thermoplastic resin, and are uniformly and finely dispersed in conditions of melt-kneading the thermoplastic resin. Examples thereof include organic particles of polyethylene terephthalate, polybutylene terephthalate, polyethylene naphthalate, polystyrene, polyamide, polycarbonate, polyethylene sulfide, polyphenylene sulfide, polyimide, polyether ketone, polyether ether ketone, polymethylmethacrylate, poly-4-methyl-1-pentene, a homopolymer of a cyclic olefin, and a copolymer of a cyclic olefin and ethylene. A fine powder of a thermosetting resin such as a melamine resin may also be used, and it is also preferable to crosslink a thermoplastic resin to insolubilize.

The filler contained in the porous layer (B) preferably has an average particle size of 0.1 µm or more, more preferably 0.3 µm or more, and preferably 5 µm or less, more preferably 2 µm or less, in view of pore formability. When the average particle size of the filler is 0.1 µm or more, a porous layer having many pores can be obtained to easily enhance the penetrability of an aqueous pigmented ink. When the average particle size of the filler is 5 µm or less, formation of too large pores can be suppressed to easily enhance the clearness of an ink-jet printed image.

<<Filler Having Hydrophobized Surface>>

The filler having a hydrophobized surface is preferably inorganic particles or organic particles having a surface hydrophobized with paraffin or a fatty acid having 12 to 22 carbon atoms or a salt thereof, and more preferably inorganic particles or organic particles having a surface hydrophobized with a fatty acid having 12 to 22 carbon atoms or a salt thereof.

Examples of the fatty acid having 12 to 22 carbon atoms for surface hydrophobization include lauric acid, myristic acid, palmitic acid, stearic acid, arachidic acid, behenic acid, oleic acid, linoleic acid, linolenic acid, and eleostearic acid.

The method for the surface treatment is not particularly limited, and for example, it can be carried out by introducing an aqueous solution of a treatment agent to a slurry of inorganic particles or organic particles. Thus, surface-treated inorganic particles or organic particles, that is, inorganic particles or organic particles having a surface treatment layer containing paraffin or a fatty acid having 12 to 22 carbon atoms or a salt thereof on the surface thereof, can be obtained.

First Embodiment

The laminate according to the first embodiment of the present invention includes a substrate layer (A) and a porous layer (B), wherein the porous layer (B) has a first porous sub-layer (B1) and a second porous sub-layer (B2), and the substrate layer (A), the second porous sub-layer (B2), and the first porous sub-layer (B1) are layered in this order.

FIG. 1 is a cross-sectional view illustrating an example of the configuration of the laminate of the present invention, as the first embodiment.

As shown in FIG. 1, the laminate 1 has a substrate layer A and a porous layer B on one face of the substrate layer A.

The porous layer B has the first porous sub-layer B1 and the second porous sub-layer B2.

The substrate layer A, the second porous sub-layer B2, and the first porous sub-layer B1 are layered in this order.

(Substrate Layer (A))

As described in the section [laminate], the substrate layer (A) is preferably a resin film including a thermoplastic resin.

<Thermoplastic Resin>

Examples of the thermoplastic resin included in the substrate layer (A) include the same as described in the section <Thermoplastic Resin> in (Substrate Layer (A)) of [Laminate], and preferred is an olefin-based polymer, as well.

As the olefin-based polymer, a propylene-based polymer, an ethylene-based polymer, or the like is preferably used.

Examples of the propylene-based polymer include: a propylene homopolymer, such as isotactic homopolypropylene and syndiotactic homopolypropylene, which are obtained by homopolymerization of propylene; and a propylene copolymer obtained by copolymerizing propylene as a main component with, for example, an α-olefin such as ethylene, 1-butene, 1-hexene, 1-heptene, 1-octene, or 4-methyl-1-pentene. The propylene copolymer may be a bipolymer or a multipolymer such as a ter- or higher-polymer, and may be a random copolymer or a block copolymer.

Examples of the ethylene-based polymer include: high density polyethylene, medium density polyethylene, linear low density polyethylene; a copolymer obtained by copolymerizing ethylene as a main component with an α-olefin such as propylene, butene, hexene, heptene, octene, or 4-methyl-pentene-1; maleic acid-modified ethylene/vinyl acetate copolymer, ethylene/vinyl acetate copolymer, ethylene/acrylic acid copolymer, ethylene/alkyl acrylate copolymer, ethylene/alkyl methacrylate copolymer, a metal salt of ethylene/methacrylate copolymer (metal may be, for example, zinc, aluminum, lithium, sodium, or potassium), ethylene/cyclic olefin copolymer, and maleic acid-modified polyethylene.

Among the olefin-based polymers described above, a propylene homopolymer or high density polyethylene is preferable in view of the moldability and cost.

The thermoplastic resins described above may be used singly or in combinations of two or more thereof.

<Other Components>

The substrate layer may optionally include known additives, if necessary. Examples of the additives include an antioxidant, a light stabilizer, a UV absorber, a dispersant for filler, a nucleating agent, an anti-blocking agent, a plasticizer, a slip agent such as fatty acid amides, a dye, a pigment, a mold release agent, and known auxiliaries such as a flame retardant.

The substrate layer preferably includes an antioxidant, a light stabilizer, or the like, in view of enhancing the outdoor durability.

Examples of the antioxidant include a phenolic antioxidant with steric hindrance, a phosphorus antioxidant, and an amine antioxidant.

Examples of the light stabilizer include an amine light stabilizer with steric hindrance, a benzotriazole light stabilizer, and a benzophenone light stabilizer.

The content of the antioxidant and the light stabilizer is preferably 0.001 to 1 mass % based on the substrate layer.

The substrate layer may contain a filler as long as its strength is not impaired. The substrate layer may be a non-stretched film, or may be a stretched film in view of enhancing the strength. When a stretched film made of a thermoplastic resin containing a filler is used as a substrate layer, the rigidity, whiteness and opacity of the substrate layer may be tailored to the purpose. As the filler, those listed in the section <Filler> in (Porous Layer (B)) of [Laminate] can be used, and among others, those listed as <<Inorganic Particles>> are preferable. The filler in the substrate layer and that in the porous layer may be the same or different from each other.

The thickness of the substrate layer may be appropriately set according to the thickness of the porous layer and the application or the purpose of the laminate. Generally, the thickness of the substrate layer is preferably 15 µm or more, more preferably 20 µm or more, and even more preferably 30 µm or more, in view of obtaining sufficient body. The thickness of the substrate layer is preferably 400 µm or less, more preferably 300 µm or less, and even more preferably 200 µm or less.

(Porous Layer (B))

The porous layer (B) in the first embodiment has the first porous sub-layer (B1), which provides the surface of the porous layer (B), and the second porous sub-layer (B2).

Preferably, the porous layer (B) further has a formation-supporting layer (B3).

FIG. 2 is a cross-sectional view illustrating another example of the configuration of the laminate of the present invention, as the first embodiment.

When the laminate 1 has the formation-supporting layer B3, the formation-supporting layer B3 is preferably interposed between the substrate layer A and the second porous sub-layer B2, as shown in FIG. 2. Namely, the substrate layer A, the formation-supporting layer B3, the second porous sub-layer B2, and the first porous sub-layer B1 are preferably layered in this order.

The porous layer (B) contains a thermoplastic resin and a filler.

<Thermoplastic Resin>

Examples of the thermoplastic resin used for the porous layer (B) include the same as described in the section <Thermoplastic Resin> in (Substrate Layer (A)) hereinabove. Among others, the thermoplastic resin preferably includes an olefin-based polymer in view of obtaining a sufficient strength, and more preferably includes a propylene-based polymer. Preferably, the thermoplastic resin further includes an ethylene-based polymer and an acid-modified polypropylene, in view of increasing the porosity. The acid-modified polypropylene locates on the surface of the filler to increase the adhesion of the propylene-based polymer to the filler, and accordingly pores can be formed preferentially at the interface between the ethylene-based polymer and the propylene-based polymer when stretched. Accordingly, it is inferred that a larger pore diameter can be obtained, and that a porous structure capable of absorbing more solvent upon aqueous ink-printing and therefore exhibiting increased drying property can thus be formed.

<<Propylene-Based Polymer>>

As the propylene-based polymer contained in the porous layer (B), the same as described in the section <Thermoplastic Resin> in (Substrate Layer (A)) hereinbefore can be used.

Examples thereof include a propylene homopolymer, such as isotactic homopolypropylene and syndiotactic homopolypropylene, which are obtained by homopolymerization of propylene; and a propylene copolymer obtained by copolymerizing propylene as a main component with, for example, an α-olefin such as ethylene, 1-butene, 1-hexene, 1-heptene, 1-octene, or 4-methyl-1-pentene. The propylene copolymer may be a bipolymer or a multipolymer such as a ter- or higher-polymer, and may be a random copolymer or a block copolymer.

<<Ethylene-Based Polymer>>

As the ethylene-based polymer contained in the porous layer (B), the same as described in the section <Thermoplastic Resin> in (Substrate Layer (A)) hereinbefore can be used.

Examples thereof include: high density polyethylene, medium density polyethylene, linear low density polyethylene; a copolymer obtained by copolymerizing ethylene as a main component with an α-olefin such as propylene, butene, hexene, heptene, octene, or 4-methyl-pentene-1; maleic acid-modified ethylene/vinyl acetate copolymer, ethylene/vinyl acetate copolymer, ethylene/acrylic acid copolymer, ethylene/alkyl acrylate copolymer, ethylene/alkyl methacrylate copolymer, a metal salt of ethylene/methacrylate copolymer (metal may be, for example, zinc, aluminum, lithium, sodium, or potassium), ethylene/cyclic olefin copolymer, and maleic acid-modified polyethylene.

<<Acid-Modified Polypropylene>>

Examples of the acid-modified polypropylene include an acid anhydride group-containing polypropylene obtained by random copolymerizing or graft copolymerizing maleic anhydride; a carboxyl group-containing polypropylene obtained by random copolymerizing or graft copolymerizing an unsaturated carboxylic acid, such as methacrylic acid or acrylic acid; an epoxy group-containing polypropylene obtained by random copolymerizing or graft copolymerizing glycidyl methacrylate. Specific examples include maleic anhydride-modified polypropylene, acrylic acid-modified polypropylene, and glycidyl methacrylate-modified polypropylene, and among these, maleic anhydride-modified polypropylene is preferable.

Specific examples of maleic anhydride-modified polypropylene include Modic P908 (product name) manufactured by Mitsubishi Chemical Corporation, and UMEX 1001 (product name) manufactured by SANYO CHEMICAL INDUSTRIES, LTD.

The acid-modified polypropylene preferably has an acid modification rate of 0.01% or more, more preferably 0.05% or more, and preferably 25% or less, more preferably 20% or less.

<Filler>

Examples of the filler used for the porous layer (B) include the same as described in the section <Filler> of [Laminate], and those preferred are also as described hereinbefore, as well.

(First Porous Sub-Layer (B1))

The first porous sub-layer is a layer having a porous structure and serves as a gum residue-preventing layer. The porous structure is preferably formed by stretching a sheet containing a thermoplastic resin and a filler. The layer having a porous structure formed by stretching can be referred to as a stretched porous layer.

<Thermoplastic Resin>

Examples of the thermoplastic resin included in the first porous sub-layer include the same as listed in the section <Thermoplastic Resin> of (porous layer (B)). Among others, the first porous sub-layer preferably includes an olefin-based polymer, and more preferably includes a propylene-based polymer described hereinbefore. Preferably, the thermoplastic resin further includes the ethylene-based polymer and the acid-modified polypropylene described hereinbefore, in view of increasing the porosity.

The content of the propylene-based polymer in the first porous sub-layer is preferably 5 mass % or more, more preferably 10 mass % or more, and preferably 50 mass % or less, more preferably 30 mass % or less, in view of easily stretching the propylene-based polymer in a non-melted state and easily obtaining the porous layer with a sufficient strength.

The content of the ethylene-based polymer in the first porous sub-layer is preferably 5 mass % or more, more preferably 10 mass % or more, and preferably 50 mass % or less, more preferably 30 mass % or less, in view of easily stretching the ethylene-based polymer in a melted state and easily forming a fibrillated porous layer to improve the abrasion resistance.

The ratio between the content of the propylene-based polymer and that of the ethylene-based polymer (propylene-based polymer:ethylene-based polymer) in the first porous sub-layer is preferably 1:2 to 2:1.

The content of the acid-modified polypropylene in the first porous sub-layer is preferably 0.05 mass % or more, and more preferably 0.1 mass % or more. When the content is 0.05 mass % or more, larger pores can be formed not only around the filler described later by the stress due to stretching but also between the propylene-based polymer and the ethylene-based polymer so that even higher drying property of an ink can be obtained. The content of the acid-modified polypropylene is preferably 25 mass % or less, more preferably 20 mass % or less, even more preferably 10 mass % or less, and particularly preferably 5 mass % or less, in view of decreasing the softening point.

<Filler>

The first porous sub-layer contains a filler, and the filler contains a filler having a hydrophobized surface as a part thereof. The filler and the filler having a hydrophobized surface are as described in the section [Laminate].

<<Content and Ratio Between Contents of Fillers>>

In the first porous sub-layer, the content of the whole of the filler and the content of the filler having a hydrophobized surface described above satisfy the following relations. The "whole of the filler" refers to the all of fillers contained in the layer regardless of whether the surface of the filler is hydrophobized or not.

The content of the whole of the filler in the first porous sub-layer (B1), $C_{W1}$ (mass %), and the content of the filler having a hydrophobized surface in the first porous sub-layer (B1), $C_{H1}$ (mass %), satisfy an expression (a1) and an expression (b1) below, respectively.

$$50 \leq C_{W1} \leq 75 \quad (a1)$$

$$30 \leq C_{H1} \leq 75 \quad (b1)$$

When $C_{W1}$ and $C_{H1}$ satisfy the expression (a1) and the expression (b1), respectively, generation of gum residues can be suppressed upon molding, and also pores are likely to connect with each other in the first porous sub-layer (B1) so that the medium in an aqueous ink after printing can be transported to the second porous sub-layer (B2).

The value of $C_{W1}$ is preferably 55 or more, and more preferably 66 or more, in view of medium transportability. The value of $C_{W1}$ is preferably 70 or less in view of the stability in granulation and molding. The value of $C_{H1}$ is preferably 40 or more, and more preferably 50 or more, in view of suppressing generation of gum residues.

The ratio of the content of the filler having the hydrophobized surface, $C_{H1}$, to the content of the whole of the filler, $C_{W1}$, in the first porous sub-layer (B1) ($C_{H1}/C_{W1}$) is preferably 0.6 or more, more preferably 0.8 or more, and even more preferably 0.9 or more, in view of suppressing generation of gum residues. The ratio ($C_{H1}/C_{W1}$) may be 1.0.

<Grammage>

The first porous sub-layer (B1) preferably has a grammage of 0.5 g/m² or more, more preferably 0.8 g/m² or more, and more preferably 1.0 g/m² or more, in view of suppressing generation of gum residues. The first porous sub-layer (B1) preferably has a grammage of 10.0 g/m² or less, more preferably 8.0 g/m² or less, and even more preferably 6.0 g/m² or less, in view of the medium transportability and ink bleed. The grammage of each layer can be determined from the density and the thickness of the layer. The grammage of the layer can be adjusted by the thickness of the layer, the content and the average particle size of the filler, and the conditions for stretching, including the stretching temperature and the stretch ratio.

<Thickness>

The first porous sub-layer preferably has a thickness of 0.5 μm or more, more preferably 1.0 μm or more, and even more preferably 2.0 μm or more, in view of the grammage. The first porous sub-layer preferably has a thickness of 40 μm or less, more preferably 20 μm or less, and even more preferably 10 μm or less, in view of the medium transportability and ink bleed.

<Porosity>

The first porous sub-layer preferably has a porosity of 20% or more, more preferably 25% or more, even more preferably 35% or more, and preferably 75% or less, more preferably 65% or less, even more preferably 55% or less, in view of the medium transportability and easily adjusting the mechanical strength of the porous layer.

The porosity can be adjusted by the average particle size of the filler, the formulation of the porous layer containing the filler, e.g., the ratio between the amounts of the propylene-based polymer, the ethylene-based polymer, the acid-modified polypropylene, and the filler, and the conditions for stretching, including the stretching temperature and the stretch ratio.

Regarding the method for measuring the porosity, the porosity can be determined from the ratio of the area occupied by pores in a predetermined region in the cross-section of the porous layer observed under an electronic microscope. Specifically, an arbitrary part of the film as the measurement target is cut out and embedded in an epoxy resin, followed by fixing. Then the resultant was cut with a microtome in the direction perpendicular to the face of the film as the measurement target, and mounted on the observation stage so that the cut surface serves as a surface to be observed. Gold, gold/palladium, or the like is vapor-deposited on the surface to be observed. Pores in the porous layer are observed at an arbitrary magnification suitable for observing (e.g., a magnification factor of 500× to 3000×) under the electronic microscope, and the image data of the observed region is captured. On the image data obtained, image processing is carried out using an image analysis system, and the percentage (%) of the area of pores in the predetermined region in the porous layer is determined, which is used as the porosity (%). At this time, found values in observations at ten or more arbitrary points may be averaged to obtain the porosity.

(Second Porous Sub-Layer (B2))

The second porous sub-layer contains a filler. Similar to the first porous sub-layer, the second porous sub-layer is a layer having a porous structure and serves as an ink-absorbing layer.

<Thermoplastic Resin>

Examples of the thermoplastic resin included in the second porous sub-layer include the same as listed in the section <Thermoplastic Resin> of (Porous Layer (B)). Among others, the second porous sub-layer preferably includes an olefin-based polymer, and more preferably includes the propylene-based polymer described hereinbefore. Preferably, the thermoplastic resin further includes the ethylene-based polymer and the acid-modified polypropylene described hereinbefore, in view of increasing the porosity.

The content of the propylene-based polymer in the second porous sub-layer is preferably 5 mass % or more, more preferably 10 mass % or more, and preferably 50 mass % or less, more preferably 30 mass % or less, in view of easily stretching the propylene-based polymer in a non-melted state and easily obtaining the porous layer with a sufficient strength.

The content of the ethylene-based polymer in the second porous sub-layer is preferably 5 mass % or more, more preferably 10 mass % or more, and preferably 50 mass % or less, more preferably 30 mass % or less, in view of easily stretching the ethylene-based polymer in a melted state and easily forming a fibrillated porous layer to improve the abrasion resistance.

The ratio between the content of the propylene-based polymer and that of the ethylene-based polymer (propylene-based polymer:ethylene-based polymer) in the second porous sub-layer is preferably 1:2 to 2:1.

The content of the acid-modified polypropylene in the second porous sub-layer is preferably 0.05 mass % or more, and more preferably 0.1 mass % or more. When the content is 0.05 mass % or more, larger pores can be formed not only around particles of the filler described later by the stress due to stretching but also between the propylene-based polymer and the ethylene-based polymer, so that even higher drying property can be obtained. The content of the acid-modified polypropylene is preferably 25 mass % or less, more preferably 20 mass % or less, even more preferably 10 mass % or less, and particularly preferably 5 mass % or less, in view of decreasing the softening point.

<Filler>

The filler in the second porous sub-layer may include a filler having a hydrophobized surface, but preferably includes no filler having a hydrophobized surface. The filler and the filler having a hydrophobized surface are as described in the section [Laminate].

<<Contents and Ratio Between Contents of Fillers>>

In the second porous sub-layer, the content of the whole of the filler and the content of the above-described filler having a hydrophobized surface satisfy the following relations.

The content of the whole of the filler in the second porous sub-layer (B2), $C_{W2}$ (mass %), and the content of the filler having a hydrophobized surface in the second porous sub-layer (B2), $C_{H2}$ (mass %), satisfy the expression (a2) and the expression (b2) below, respectively.

$$50 \leq C_{W2} \leq 75 \quad (a2)$$

$$0 \leq C_{H2} \leq 15 \quad (b2)$$

When $C_{W2}$ and $C_{H2}$ satisfy the expression (a2) and the expression (b2), respectively, pores in the second porous sub-layer (B2) are likely to connect with each other and can sufficiently receive the medium passing through the first porous sub-layer (B1) to thereby obtain high drying property.

The value of $C_{W2}$ is preferably 55 or more, and more preferably 60 or more in view of the drying property. The value of $C_{W2}$ is preferably 70 or less in view of the stability in granulation and molding. The value of $C_{H2}$ is preferably 10 or less, and more preferably 5 or less, in view of drying property.

The ratio of the content of the filler having the hydrophobized surface, $C_{H2}$, to the content of the whole of the filler, $C_{W2}$, in the second porous sub-layer (B2) ($C_{H2}/C_{W2}$) is preferably 0.3 or less, more preferably 0.2 or less, and even more preferably 0.1 or less, in view of the drying property. The ratio ($C_{H1}/C_{W1}$) may be 0.

The porous layer contains a larger amount of the filler in view of sufficiently transporting the medium in an aqueous pigmented ink to its porous structure and receiving the medium by the porous structure to exhibit excellent drying property. However, when the porous layer contains a larger amount of the filler, gum residues tends to generate upon molding. Then, the filler having a hydrophobized surface is contained in the porous layer to thereby suppress the generation of gum residues upon molding. When the first porous sub-layer, which provides the outermost surface, in the porous layer contains the filler having a hydrophobized surface in a predetermined amount or more, the generation of gum residues can be suppressed upon molding. On the other hand, if the amount of the filler having a hydrophobized surface is too much, it is difficult to obtain high drying property. Then, a porous layer (second porous sub-layer) that does not contain a predetermined amount or more of the filler having a hydrophobized surface is provided inside, and thus the porous layer (B) as a whole likely to exhibit drying property while produced with less gum residues generated.

<Grammage>

The second porous sub-layer (B2) preferably has a grammage of 4.0 g/m$^2$ or more, more preferably 6.0 g/m$^2$ or more, and more preferably 8.0 g/m$^2$ or more, in view of the amount of the medium received and drying property. The second porous sub-layer (B2) preferably has a grammage of 20.0 g/m$^2$ or less, and more preferably 15.0 g/m$^2$ or less, in view of the production cost of the laminate <Thickness>

The second porous sub-layer preferably has a thickness of 5 µm or more, more preferably 10 µm or more, and even more preferably 15 µm or more, in view of sufficiently ensuring the region for allowing an aqueous pigmented ink to penetrate. The second porous sub-layer preferably has a thickness of 100 µm or less, more preferably 70 µm or less, and even more preferably 60 µm or less, in view of avoiding an excessively large thickness of the thermoplastic resin as the laminate.

<Porosity>

The second porous sub-layer preferably has a porosity of 30% or more, more preferably 40% or more, even more preferably 50% or more, and 75% or less, more preferably 70% or less, even more preferably 65% or less, in view of easily adjusting the drying property and the mechanical strength of the porous layer.

(Formation-Supporting Layer (B3))

The porous layer (B) may have a formation-supporting layer (B3) as a layer for supporting the first porous sub-layer (B1) and the second porous sub-layer (B2). Although the formation-supporting layer (B3) is a part of the porous layer (B), the formation-supporting layer (B3) itself may not have a porous structure.

The formation-supporting layer (B3) is effective as a layer for supporting the first porous sub-layer (B1) and the second porous sub-layer (B2) when the porous layer is formed by co-extrusion molding. In a case where the porous layer (B) has the formation-supporting layer (B3), molding can be more stably carried out by co-extruding the first porous sub-layer (B1), the second porous sub-layer (B2) and the formation-supporting layer (B3).

The formation-supporting layer preferably includes an olefin-based polymer, and more preferably includes a propylene-based polymer. The formation-supporting layer may also contain a filler. As these components of the formation-supporting layer, the same polymers and fillers as described for the first porous sub-layer and second porous sub-layer can be used, for example.

The content of the olefin-based polymer in the formation-supporting layer is preferably 40 mass % or more, more preferably 50 mass % or more, and preferably 95 mass % or less, more preferably 80 mass % or less, in view of easily stretching the olefin-based polymer in a non-melted state and easily obtaining a sufficient strength.

When the formation-supporting layer includes the filler, the content of the filler in the formation-supporting layer is preferably 5 mass % or more, more preferably 20 mass % or more, and preferably 60 mass % or less, more preferably 50 mass % or less, in view of stability in molding upon co-extrusion molding.

The formation-supporting layer preferably has a thickness of 5 µm or more, more preferably 10 µm or more, and even more preferably 15 µm or more, in view of stability of molding upon co-extrusion molding. The formation-supporting layer preferably has a thickness of 100 µm or less, more preferably 70 µm or more, and even more preferably 60 µm or more, in view of avoiding an excessively thick laminate.

(Method for Producing Laminate)

The method for producing the laminate of the present invention is not particularly limited, and the laminate can be produced by a common method.

For example, after a thermoplastic resin film constituting the substrate layer is formed, a thermoplastic resin film constituting the porous layer may be laminated thereon. Examples of the method for molding a film include casting in which a melted resin is extruded into a sheet form through a single layer or multilayer T-die or I-die, or the like connected to a screw extruder, for example; calendering, rolling, and inflation molding. Formation and lamination of films as the substrate layer and the porous layer may be concurrently carried out using a common technique, such as multi-dies technique involving use of a feed block and a multi-manifold or extrusion and lamination technique involving use of dies. The porous layer is preferably a co-extruded layer formed by co-extruding a film constituting the first porous sub-layer and another film constituting the second porous sub-layer (and still another film constituting the formation-supporting layer, if necessary).

The adhesion strength between the layers constituting the porous layer is larger than the adhesion strength between the porous layer and another layer (e.g., the substrate layer).

As mentioned hereinbefore, since the porous layer (B) contains the filler having a hydrophobized surface as a part of the filler, generation of gum residues upon molding, particularly generation of gum residues upon extrusion can be suppressed while the drying property of a printing ink is maintained. Accordingly, in cases where the porous layer (B) is formed through the extrusion process, the effect of the invention is remarkable, thus preferred. This holds true of not only the first embodiment but also the laminate of the present invention in general, including the second embodiment, which will be described later.

The thermoplastic resin film of the substrate layer may be stretched before laminating the porous layer, or may be stretched after laminating. Since the porous layer is thin, the porous layer is stretched preferably after laminating it on the substrate layer, rather than stretch-molding of the single layer. Particularly, the substrate layer is preferably a biaxially stretched layer, which provides a large mechanical strength. The porous layer is preferably a uniaxially stretched layer, which easily form a fibrillated surface to improve the abrasion resistance after pigmented ink-jet printing. More preferably, the substrate layer is a biaxially stretched layer and the porous layer is a uniaxially stretched layer.

Examples of a stretching method include mechanical direction stretching in which the difference in the circumferential speed between rolls is utilized, cross direction stretching in which a tenter oven is utilized, sequentially biaxially stretching in which the above two are combined, rolling, simultaneously biaxially stretching by a combination of a tenter oven with a pantograph, and simultaneously biaxially stretching by a combination of a tenter oven with a linear motor. Other simultaneously biaxially stretching may also be used in which a molten resin is extruded into a tubular shape through a circular die connected to a screw extruder, followed by blowing air into the resultant (inflation molding).

In a case where the thermoplastic resin used is an amorphous resin, the stretching temperature at which the stretching is carried out is preferably equal to or higher than the glass transition temperature of the thermoplastic resin. In the case where the thermoplastic resin used is a crystalline resin, the stretching temperature is preferably in a range from the glass transition temperature of the amorphous moiety of the thermoplastic resin to the melting point of the crystalline moiety of the thermoplastic resin, and preferably a temperature lower than the melting point of the thermoplastic resin by 2 to 60° C. For example, in a case where a propylene homopolymer (melting point: 155 to 167° C.) is used, the stretching temperature is preferably 100 to 164° C., and in a case where a high density polyethylene (melting point: 121 to 134° C.) is used, the stretching temperature is preferably 70 to 133° C.

The stretching speed is not particularly limited, and is preferably within a range from 20 to 350 m/min in view of stable stretch-molding.

The stretch ratio can also be appropriately set in consideration with, for example, the characteristics of the thermoplastic resin used. For example, in a case where a propylene homopolymer or a propylene copolymer is used, the stretch ratio upon uniaxially stretching is generally about 1.2 or more, more preferably 2 or more, in terms of the lower limit, and 12 or less, more preferably 10 or less, in terms of the upper limit. On the other hand, the stretch ratio upon biaxially stretching, specifically the area stretch ratio, is generally 1.5 or more, more preferably 4 or more, in terms of the lower limit, and 60 or less, more preferably 50 or less, in terms of the upper limit. In a case where another thermoplastic resin is uniaxially stretched, the stretch ratio is generally about 1.2 or more, more preferably 2 or more, in terms of the upper limit, and 10 or less, more preferably 5 or less, in terms of the lower limit. The stretch ratio upon biaxially stretching, specifically the area stretch ratio, is generally 1.5 or more, more preferably 4 or more, in terms of the lower limit, and 20 or less, more preferably 12 or less, in terms of the upper limit.

When the stretch ratio is within the above-described range, the targeted porosity and grammage are easily obtained so that the opacity is easily improved. In addition, the breakage of the laminate is unlikely to be caused so that stable stretch-molding tends to be achieved.

Second Embodiment

The laminate according to the second embodiment of the present invention includes a substrate layer (A) and a porous layer (B), and the porous layer (B) is a porous layer (B4) satisfying expressions (a4), (b4), and (c4) below:

$$50 < C_W \leq 75 \qquad (a4)$$

$$30 \leq C_H \qquad (b4)$$

$$C_H \leq 4 C_W / 5 \qquad (c4)$$

wherein $C_W$ represents the content (mass %) of the whole of the filler in the porous layer (B4), and $C_H$ represents the content (mass %) of the filler having a hydrophobized surface in the porous layer (B4).

FIG. 3 is a cross-sectional view illustrating another example of the configuration of the laminate according to the present invention, as the second embodiment.

As shown in FIG. 3, the laminate 1 has a substrate layer A and a porous layer B4 on one face of the substrate layer A.

(Substrate Layer (A))

As the substrate layer (A), the same, in terms of the material and the specification, as described in the section (Substrate Layer (A)) in [First Embodiment] can be used. Preferred are also the same as described hereinbefore.

(Porous Layer (B4))

The porous layer (B4) contains a thermoplastic resin and a filler.

<Thermoplastic Resin>

Examples of the thermoplastic resin included in the porous layer (B4) include the same resins as described in the section <Thermoplastic Resin> of (Porous Layer (B)) in [First Embodiment], and preferred resin are also the same. Specifically, the thermoplastic resin contained in the porous layer (B4) preferably includes an olefin-based polymer, more preferably includes a propylene-based polymer, and even more preferably further includes an ethylene-based polymer and an acid-modified propylene.

The content of the propylene-based polymer in the porous layer (B4) is preferably 5 mass % or more, more preferably 10 mass % or more, and preferably 50 mass % or less, more preferably 30 mass % or less, in view of easily stretching the propylene-based polymer in a non-melted state and easily obtaining the porous layer with a sufficient strength.

The content of the ethylene-based polymer in the porous layer (B4) is preferably 5 mass % or more, more preferably 10 mass % or more, and preferably 50 mass % or less, more preferably 30 mass % or less, in view of easily stretching the ethylene-based polymer in a melted state and easily forming a fibrillated porous layer to improve the abrasion resistance.

The ratio between the content of the propylene-based polymer and that of the ethylene-based polymer (propylene-based polymer:ethylene-based polymer) in the porous layer (B4) is preferably 1:2 to 2:1.

The content of the acid-modified polypropylene in the porous layer (B4) is preferably 0.05 mass % or more, and more preferably 0.1 mass % or more. When the content is 0.05 mass % or more, larger pores can be formed not only around particles described later by the stress due to stretching but also between the propylene-based polymer and the ethylene-based polymer so that even higher drying property of an ink can be obtained. The content of the acid-modified polypropylene is preferably 25 mass % or less, more preferably 20 mass % or less, even more preferably 10 mass % or less, and particularly preferably 5 mass % or less, in view of decreasing the softening point.

<Filler>

The first porous layer (B4) contains a filler, and the filler contains a filler having a hydrophobized surface. The filler and the filler having a hydrophobized surface are as described in the section [Laminate].

<<Contents and Ratio Between Contents of Fillers>>

The content of the whole of the filler and the content of the filler having a hydrophobized surface described above in the porous layer (B4) satisfy the following relations.

The content of the whole of the filler in the porous layer (B4), $C_W$ (mass %), and the content of the filler having a hydrophobized surface in the porous layer (B4), $C_H$ (mass %).

At this time, $C_W$ and $C_H$ satisfy expressions (a4), (b4), and (c4).

$$50 \leq C_W \leq 75 \quad (a4)$$

$$30 \leq C_H \quad (b4)$$

$$C_H \leq 4C_W/5 \quad (c4)$$

The value of $C_H$ is preferably 40 or more, in view of prevention of generation of gum residues. The value of $C_H$ is preferably $3.5C_W/5$ or less, in view of the drying property of a printing ink.

When the porous layer (B4) in the laminate satisfies the expressions (a4), (b4), and (c4), the drying property of a printing ink can be ensured as clear from the results in Examples, which will be described later, and in addition, generation of gum residues can be suppressed upon production of the porous layer (B4).

The filler is contained in a relatively large amount in the porous layer (B4), in view of the penetrability of an aqueous pigmented ink and the amount of water absorbed. For example, the content of the whole of the filler contained in the porous layer (B4) is more than 50 mass %, and more preferably 60 mass % or more. However, when the content of the whole of the filler contained in the porous layer (B4) is more than 50 mass %, particularly 60 mass % or more, the problem of generation of gum residues is considerable. Then, the filler having a hydrophobized surface can be contained in an amount of 30 mass % or more, more preferably 40 mass % or more in the porous layer (B4), to thereby effectively suppress the generation of gum residues upon production. On the other hand, the content of the filler having a hydrophobized surface in the whole of the filler is 80 mass % or less (i.e., $C_H \leq 4C_W/5$), preferably 70 mass % or less (i.e., $C_H \leq 3.5C_W/5$), since the drying property of a printing ink can be easily obtained.

When the content of the whole of the filler contained in the porous layer (B4), $C_W$, is 75 mass % or less, stable granulation and stable stretch-molding of the porous layer (B4) can be achieved.

The porous layer (B4) according to the present invention can be produced with less gum residues generated while ensuring the drying property of a printing ink, as shown in the results in Examples, which will be described later.

The filler having a hydrophobized surface contained in the porous layer (B4) has been treated with paraffin or a fatty acid having 12 to 22 carbon atoms or a salt thereof. If a filler without any surface treatment is contained in a large amount, generation of gum residues cannot be prevented. If a fatty acid is simply added to a thermoplastic resin composition without using filler having a surface treated with a fatty acid having 12 to 22 carbon atoms, generation of gum residues cannot be prevented effectively.

In order to form favorable pores in the porous layer (B4) to obtain favorable drying property of a printing ink, a specific thermoplastic resin is preferably contained in the porous layer (B4). Specifically, it is preferable that the porous layer (B4) contain an ethylene-based polymer and a propylene-based polymer which are incompatible with each other as well as an acid-modified polypropylene. The following is inferred: the acid-modified polypropylene can locates on the surface of the filler to enhance the adhesion of the filler to the propylene-based polymer to thereby preferentially form pores at the interface between the ethylene-based polymer and the propylene-based polymer; the diameter of the pores can be thus enlarged so that a larger amount of the medium in a printing ink can be absorbed; and thus, a porous layer exhibiting improved drying property can be formed.

<Grammage>

The porous layer (B4) preferably has a grammage of 3 g/m² or more, more preferably 6 g/m² or more, even more preferably 8 g/m² or more, and particularly preferably 10 g/m² or more, in view of easily obtaining the capacity for absorbing an ink. The porous layer (B4) preferably has a grammage of 50 g/m² or less, more preferably 40 g/m² or less, and even more preferably 30 g/m² or less, since the porous layer (B4) has a smaller mechanical strength than the substrate layer.

The grammage can be determined from the density and the thickness of the porous layer (B4).

The grammage of the porous layer (B4) can be adjusted by the thickness of the porous layer (B4), the content and the average particle size of the filler, and the conditions for stretching, including the stretching temperature and the stretch ratio.

<Thickness>

The porous layer (B4) preferably has a thickness of 5 μm or more, more preferably 10 μm or more, and even more preferably 15 μm or more, in view of sufficiently ensuring a region for allowing an aqueous pigmented ink to penetrate. The porous layer (B4) preferably has a thickness of 100 μm or less, more preferably 70 μm or less, and even more preferably 60 μm or less, in view of avoiding an excessively large thickness of the laminate.

<Porosity>

The porous layer (B4) preferably has a porosity of 25% or more and preferably 60% or less, in view of easily adjusting the ink-absorbing rate and the mechanical strength of the porous layer (B4).

The porosity of the porous layer (B4) can be adjusted by the average particle size of the filler, the formulation of the porous layer (B4), e.g., the ratio between the amounts of the propylene-based polymer, the ethylene-based polymer, and the acid-modified polypropylene, and the conditions for stretching, including the stretching temperature and the stretch ratio.

Regarding the method for measuring the porosity, the porosity can be determined from the ratio of the area occupied by pores in a predetermined region in the cross-section of the porous layer (B4) observed under an electronic microscope. Specifically, an arbitrary part of the film as the measurement target is cut out and embedded in an epoxy resin, followed by fixing. Then the resultant was cut with a microtome in the direction perpendicular to the face of the film as the measurement target, and mounted on the observation stage so that the cut surface serves as a surface to be observed. Gold, gold/palladium, or the like is vapor-deposited on the surface to be observed. Pores in the porous layer (B4) is observed at an arbitrary magnification suitable for observing (e.g., a magnification factor of 500× to 3000×) under the electronic microscope, and the image data of the observed region is captured. On the image data obtained, image processing is carried out using an image analysis system, and the percentage (%) of the area of pores in the predetermined region in the porous layer (B4) is determined, which is used as the porosity (%). At this time, found values in observations at ten or more arbitrary points may be averaged to obtain the porosity.

(Method for Producing Laminate)

The laminate of the present invention having the porous layer (B4) can be produced by the same method as the method described in the section <Method for Producing Laminate> in [First Embodiment]. As described hereinbefore, the porous layer (B4) is also preferably formed through an extrusion process, since the effect of the present invention is remarkable in such a case.

[Laminate Having Coating Layer]

The laminate of the present invention may further have a coating layer containing a cationic polymer on the surface of the porous layer (B). The laminate of the present invention that has the coating layer has the substrate layer (A), the porous layer (B), and the coating layer, in this order. The laminate of the present invention that has the coating layer can be particularly used effectively as ink-jet printable paper, Here, the coating layer is a thin film covering the whole or part of the surface of the porous layer and contains the cationic polymer to thereby exhibit high affinity to a color component of an ink. Accordingly, the color component can be fixed on the surface of the porous layer to prevent spreading so that ink bleed can be suppressed to highly improve printability.

As the cationic polymer used for the coating layer, a fixing agent used for common aqueous dye or aqueous pigmented ink-jet printing can be used, and the fixing agent is preferably a polymer including a primary, secondary, or tertiary amine salt or a quaternary ammonium salt, in view of enhancing the affinity to an aqueous pigmented ink, and is more preferably a polymer including a quaternary ammonium salt.

The coating mass of the coating layer is preferably 0.05 g/m² or more, and preferably 1.5 g/m² or less, in terms of solids. When the coating mass of the coating layer is 0.05 g/m² or more, the fixability of an aqueous pigmented ink is easily exhibited. When the coating mass of the coating layer is 1.5 g/m² or less, openings in the porous layer do not filled up with the coating layer, and the abrasion resistance is easily improved.

The coating layer may further contain additives such as an antioxidant, an antiblocking agent, an antistatic agent, and an antifungal agent. The amount of the additives in the coating layer is preferably 0.01 mass % or more, and preferably 3 mass % or less.

[Ink-Jet Printable Paper]

The ink-jet printable paper of the present invention includes the laminate according to [First Embodiment] or [Second Embodiment] described above, or the others of the present invention. When the laminate has a coating layer, the ink-jet printable paper of the present invention includes the laminate of the present invention that has a coating layer. In other words, the ink-jet printable paper of the present invention may be, for example, a laminate having a coating layer on the first porous sub-layer in [First Embodiment] or on the porous layer (B4) in [Second Embodiment].

[Print on Laminate and Ink-Jet Printable Paper]

The laminate and ink-jet printable paper of the present invention has ink-jet printability, and various information, such as photos, figures, texts, and patterns, can be printed on the porous layer (B) or the coating layer by ink-jet technique. For printing, various inks for ink-jet printing can be used, including aqueous, solvent-based, and ultraviolet curable inks for ink-jet printing. Among others, the laminate and ink-jet printable paper of the present invention is excellent in printability with an aqueous pigmented ink, and cause less bleeding even upon multicolor printing to achieve bright ink-jet printing with high sharpness. In addition to or alternatively to ink-jet printing, recording can be performed thereon with an aqueous or oil-based felt-tip pen, a fluorescent marker, a pencil, or the like.

<Aqueous Pigmented Ink>

The aqueous pigmented ink contains, for example, water, a pigment, a dispersant, an aqueous organic solvent, and a surfactant. The aqueous ink herein refers to an ink in which water accounts for 60 mass % or more based on the medium component(s).

The contents of the components are usually as follows: pigment, about 0.2 to 10 mass %; dispersant, about 1.5 to 15 mass %; aqueous organic solvent, about 5 to 40 mass %; and surfactant, about 0.5 to 2 mass %; all based on the total mass (100 mass %) of the ink.

EXAMPLES

The present invention will be further specifically described by way of Examples below; however, the present invention is not limited to Examples below as long as it does not depart from the scope of the technical concept thereof. In Examples, "part(s)," "%," and the like are by mass, unless otherwise noticed.

Production Example 1: Preparation of Filler Having Hydrophobized Surface

Water was added to 1.0 kg of synthetic calcium carbonate (light calcium carbonate) having a BET specific surface area of 16 m$^2$/g, and the resultant was stirred at 40° C. to make a calcium carbonate slurry having a solid content of 10 mass %. Then, a 10 mass % sodium laurate aqueous solution at 90° C. was prepared, and the prepared solution and the calcium carbonate slurry were mixed and stirred to thereby hydrophobize the surface of calcium carbonate. The resulting slurry including calcium carbonate having a hydrophobized surface was dried to a solid content of 60%. Thereafter, the resultant was dehydrated using a dryer to obtain hydrophobized inorganic particles.

Example 1

(Production of Film Uniaxially Stretched in Mechanical Direction)

15 parts by mass of propylene homopolymer PP-2 (product name: NOVATEC PP MA3H, manufactured by Japan Polypropylene Corporation), 59.5 parts by mass of propylene homopolymer PP-3 (product name: NOVATEC PP FY6H, manufactured by Japan Polypropylene Corporation), 9.5 parts by mass of high density polyethylene PE-1 (product name: NOVATEC HD HJ590N, manufactured by Japan Polypropylene Corporation), 16 parts by mass of heavy calcium carbonate powder F-1 (product name: SOFTON 1800, manufactured by BIHOKU FUNKA KOGYO CO., LTD.), and 0.1 parts by mass of oleic acid D-1 as a dispersant (product name: LUNAC O-V, manufactured by Kao Corporation) were blended and stirred/mixed using a mixer to obtain a resin composition A-1.

Using an extruder set at 250° C., the above-described resin composition A-1 was melt-kneaded and then extruded into a sheet shape through a die, and the resultant was cooled to 70° C. using a cooler to thereby obtain a non-stretched monolayer film. The non-stretched film was reheated to 145° C. and then stretched 5 times in the mechanical direction by utilizing the difference in the circumferential speed between the rolls to thereby obtain a film uniaxially stretched in the mechanical direction.

The materials composing the resin composition A-1 and the blending ratios of the materials (parts by mass) are shown in Table 1 and Table 2 below. The abbreviations in Table 2 are the same as those described in Table 1.

TABLE 1

| Material | Abbreviation | Name | Contents |
| --- | --- | --- | --- |
| Thermoplastic Resin | PP-2 | Propylene Homopolymer | Product Name: NOVATEC PP MA3H, Manufactured by Japan Polypropylene Corporation MFR: 10 g/10 min (230° C., 2.16 kg Load), Melting Point: 164° C. (Peak Temperature in DSC), Density: 0.9 g/cm$^3$ |
| | PP-3 | Propylene Homopolymer | Product Name: NOVATEC PP FY6H, Manufactured by Japan Polypropylene Corporation MFR: 1.9 g/10 min (230° C., 2.16 kg Load), Melting Point: 164° C. (Peak Temperature in DSC), Density: 0.9 g/cm$^3$ |
| | PE-1 | High Density Polyethylene | Product Name: NOVATEC HD HJ590N, Manufactured by Japan Polypropylene Corporation MFR: 40 g/10 min (190° C., 2.16 kg Load), Melting Point: 133° C. (Peak Temperature in DSC), Density: 0.96 g/cm$^3$ |
| Inorganic Particles (Filler) | F-1 | Heavy Calcium Carbonate Powder | Product Name: SOFTON 1800, manufactured by BIHOKU FUNKA KOGYO CO., LTD. Average Particle Size: 1.25 μm (Air Permeability Method), Dried and Ground Product |
| Dispersant | D-1 | Oleic Acid | Product Name: LUNAC O-V, Manufactured by Kao Corporation |

TABLE 2

| Material | Abbreviation | Resin Composition (Parts by Mass) |
| --- | --- | --- |
| Thermoplastic Resin | PP-2 | 15.0 |
| | PP-3 | 59.5 |
| | PE-1 | 9.5 |
| Inorganic Particles (Filler) | F-1 | 16.0 |
| Dispersant | D-1 | 0.1 |

(Production of Laminate (Stretched Tetralayer Film))
<Preparation of Resin Composition B-1-1>

19 parts by mass of high-crystalline polypropylene PP-1 (product name: MA3U, manufactured by Japan Polypropylene Corporation) being a propylene homopolymer, 19 parts by mass of high density polyethylene PE-2 (product name: NOVATEC HD HJ490, manufactured by Japan Polypropylene Corporation), 60 parts by mass of light calcium carbonate powder having a hydrophobized surface, F-2 (hydrophobized inorganic particles in Production Example 1), and 2.0 parts by mass of maleic acid-modified polypropylene (acid-modified PP) (product name: Modic P908, manufactured by Mitsubishi Chemical Corporation) were blended and stirred/mixed using a mixer to obtain a resin composition B-1-1 for forming a first porous sub-layer (B1).

<Preparation of Resin Composition B-2-1>

19 parts by mass of high-crystalline polypropylene PP-1 (product name: MA3U, manufactured by Japan Polypropylene Corporation) being a propylene homopolymer, 19 parts by mass of high density polyethylene PE-2 (product name: NOVATEC HD HJ490, manufactured by Japan Polypropylene Corporation), 60 parts by mass of heavy calcium carbonate powder that had not undergone any surface treatment, F-1 (product name: SOFTON 1800, manufactured by BIHOKU FUNKA KOGYO CO., LTD.), and 2.0 parts by mass of maleic acid-modified polypropylene (acid-modified PP) (product name: Modic P908, manufactured by Mitsubishi Chemical Corporation) were blended and stirred/mixed using a mixer to obtain a resin composition B-2-1 for forming a second porous sub-layer (B2).

<Resin Composition B-3-1>

30 parts by mass of a propylene homopolymer PP-2 (product name: NOVATEC PP MA3H, manufactured by Japan Polypropylene Corporation), 21 parts by mass of a propylene homopolymer PP-3 (product name: NOVATEC PP FY6H, manufactured by Japan Polypropylene Corporation), 4 parts by mass of high density polyethylene PE-1 (product name: NOVATEC HD HJ590N, manufactured by Japan Polypropylene Corporation), 45 parts by mass of heavy calcium carbonate powder F-1 (product name: SOFTON 1800, manufactured by BIHOKU FUNKA KOGYO CO., LTD.), and 0.5 parts by mass of oleic acid D-1 as a dispersant (product name: LUNAC O-V, manufactured by Kao Corporation) were blended and stirred/mixed using a mixer to obtain a resin composition B-3-1 for forming a formation-supporting layer (B3).

<Preparation of Laminate>

Using an extruder set at 250° C., the above-described resin compositions B-1-1, B-2-1, and B-3-1 were each melt-kneaded and then fed to an extrusion die. Then, these were extruded into a trilayer sheet shape, and the resultant was layered on one face of the above-described film uniaxially stretched in the mechanical direction so that the face of the film derived from the resin composition B-3-1 of the trilayer film, in which the films derived from the above described resin composition B-1-1, B-2-1, and B-3-1 were layered in this order, was brought into contact with the one face of the uniaxially stretched film, thereby obtaining a laminate having a tetralayer structure. By extruding the resin compositions B-1-1 and B-2-1 together with the resin composition B-3-1 into a sheet shape, a laminate was obtained stably.

The resulting laminate was reheated to 160° C. in an oven and then stretched 9 times in the cross direction using a tenter. Then, the resultant was heat-treated at 170° C. to obtain a stretched film having a tetralayer structure consisting of one biaxially stretched layer and three uniaxially stretched layer, which was provided as the laminate including a thermoplastic resin film of Example 1. In the laminate of Example 1, the biaxially stretched layer derived from the resin composition A-1 was a substrate layer; the uniaxially stretched layer derived from the resin composition B-1-1 and that from the resin composition B-2-1 were the first porous sub-layer and the second porous sub-layer, respectively; and the uniaxially stretched layer derived from the resin composition B-3-1 was the formation-supporting layer.

The laminate of Example 1 had a thickness of 88 μm. The substrate layer derived from the resin composition A-1 had a thickness of 43 μm and a grammage of 30 g/m$^2$. The layers derived from the resin compositions B-1-1, B-2-1, and B-3-1 had thicknesses of 5 μm, 20 μm, and 20 μm, respectively, and the total thickness of these was 42 μm. The layers derived from the resin compositions B-1-1, B-2-1, and B-3-1 had grammages of 2 g/m$^2$, 8 g/m$^2$, and 20 g/m$^2$, respectively, and the total grammage of these was 30 g/m$^2$.

The materials composing the resin compositions B-1-1, B-2-1, and B-3-1 and the blending ratios of the materials (parts by mass) are shown in Table 3 to Table 5 below. The abbreviations in Table 4 and Table 5 are the same as those described in Table 3.

A fixing agent (product name: PAPYOGENE P-105, manufactured by SENKA corporation, a polymeric quarternary ammonium salt) and an antistatic agent (product name: SAFTOMER ST-3200, Mitsubishi Chemical Corporation) were mixed with each other in a mass ratio of 1:1 in terms of the solid content, and the resultant was diluted with water to obtain a coating liquid. The coating liquid was applied to the surface on the porous layer side of the laminate obtained above in Example 1 and dried at 105° C. using a hot air dryer to form a coating layer on the porous layer. The coating mass was 0.13 g/m$^2$ in terms of the solid content.

<Measurement of Liquid-Absorptive Capacity>

The liquid-absorptive capacity in terms of the Cobb absorptiveness was measured in accordance with JIS P 8140 on the surface on the first porous sub-layer side of the laminate obtained.

The time of contact was 120 seconds, and a 70 mass % ethanol aqueous solution was used as the test medium.

<<Evaluation Criteria>>

A (Excellent): 17 cc/m$^2$ or more
B (Good): 13 cc/m$^2$ or more and less than 17 cc/m$^2$
C (Fair): 10 cc/m$^2$ or more and less than 13 cc/m$^2$
D (Poor): less than 10 cc/m$^2$ The found liquid-absorptive capacity is shown in Table 6.

Examples 2 to 12, Comparative Examples 1 to 4

The laminates including each a thermoplastic resin film of Examples 2 to 12 and Comparative Examples 1 to 4 were obtained in the same manner as in Example 1, except that the kinds of the raw materials and the blending ratios in the resin compositions B-1-1 and B-2-1 for the porous layer used in Example 1 were changed as shown in Table 4 to Table 6. Each of the laminates was a stretched film having a tetralayer structure consisting of one biaxially stretched layer and three uniaxially stretched layer. In each of the laminates, the biaxially stretched layer was a substrate layer; two of the uniaxially stretched layers were the first porous sub-layer and the second porous sub-layer, respectively; and the other one of the uniaxially stretched layers was the formation-supporting layer.

Example 13

The resin composition A-1 was obtained in the same manner as in Example 1.

Using an extruder set at 250° C., the above-described resin composition A-1 was melt-kneaded and then extruded into a sheet shape through a die, and the resultant was cooled to 70° C. using a cooler to thereby obtain a non-stretched monolayer film. The non-stretched film was reheated to 145°

C. and then stretched 5 times in the mechanical direction by utilizing the difference in the circumferential speed between the rolls to thereby obtain a film uniaxially stretched in the mechanical direction.

The resin compositions B-1-1 and the resin compositions B-2-1 were obtained in the same manner as in Example 1.

Using an extruder set at 250° C., the above-described resin compositions B-1-1 and B-2-1 were each melt-kneaded and then fed to an extrusion die. Then, these were extruded into a bilayer sheet shape, and the resultant was layered on one face of the above-described film uniaxially stretched in the mechanical direction so that the face of the film derived from the resin composition B-2-1 of the bilayer film, in which the films derived from the above described resin composition B-1-1 and B-2-1 were layered in this order, was brought into contact with the one face of the uniaxially stretched film, thereby obtaining a laminate having a trilayer structure.

The resulting laminate was reheated to 160° C. in an oven and then stretched 9 times in the cross direction using a tenter. Then, the resultant was heat-treated at 170° C. to obtain a stretched film having a trilayer structure consisting of one biaxially stretched layer and two uniaxially stretched layer, which was provided as the laminate including a thermoplastic resin film of Example 13. In the laminate of Example 13, the biaxially stretched layer derived from the resin composition A-1 was a substrate layer; and the uniaxially stretched layer derived from the resin composition B-1-1 and that from the resin composition B-2-1 were the first and the second porous sub-layers, respectively.

The laminate of Example 13 had a thickness of 68 µm. The substrate layer derived from the resin composition A-1 had a thickness of 43 µm and a grammage of 30 g/m². The porous layers derived from the resin compositions B-1-1 and B-2-1 had thicknesses of 5 µm and 20 µm, respectively, and the total thickness of these was 25 µm. The porous layers derived from the resin compositions B-1-1 and B-2-1 had grammages of 2 g/m² and 8 g/m², respectively, and the total grammage of these was 10 g/m².

TABLE 3

| Material | Abbreviation | Name | Contents |
|---|---|---|---|
| Thermoplastic Resin | PP-1 | Propylene Homopolymer | Product Name: MA3U, Manufactured by Japan Polypropylene Corporation<br>MFR: 15 g/10 min (230° C., 2.16 kg Load), Melting Point: 167° C. (Peak Temperature in DSC) |
| | PE-2 | High Density Polyethylene | Product Name: NOVATEC HD HJ490, Manufactured by Japan Polypropylene Corporation<br>MFR: 20 g/10 min (190° C., 2.16 kg Load), Melting Point: 133° C. (Peak Temperature in DSC), Density: 0.96 g/cm³ |
| | Acid-Modified PP | Maleic Acid-Modified Polypropylene | Product Name: Modic P908, manufactured by Mitsubishi Chemical Corporation<br>MFR: 45 g/10 min (230° C., 2.16 kg Load), Melting Point: 150° C. (Peak Temperature in DSC) |
| Non-Treated Filler | F-1 | Heavy Calcium Carbonate Powder | Product Name: SOFTON 1800, manufactured by BIHOKU FUNKA KOGYO CO., LTD.<br>Average Particle Size: 1.25 µm (Air Permeability Method), Dried and Ground Product |
| Filler Having Hydrophobized Surface | F-2 | Calcium Carbonate Powder Treated with Sodium Laurate | Inorganic Particles Having Hydrophobized Surface in Production Example 1 |

TABLE 4

| | Resin Composition B-1 | | | | | | | |
|---|---|---|---|---|---|---|---|---|
| Composition | PP-1 [Parts by Mass] | PE-2 [Parts by Mass] | Acid-Modified PP [Parts by Mass] | F-1 (Non-Treated) [Parts by Mass] | F-2 (Hydrophobized) [Parts by Mass] | Sodium Laurate [Parts by Mass] | $C_{W1}$ [Mass %] | $C_{H1}$ [Mass %] |
| B-1-1 | 19 | 19 | 2 | — | 60 | — | 60 | 60 |
| B-1-2 | 24 | 24 | 2 | — | 50 | — | 50 | 50 |
| B-1-3 | 19 | 19 | 2 | 30 | 30 | — | 60 | 30 |
| B-1-4 | 38 | — | 2 | — | 60 | — | 60 | 60 |
| B-1-5 | 20 | 20 | — | — | 60 | — | 60 | 60 |
| NB-1-1 | 29 | 29 | 2 | — | 40 | — | 40 | 40 |
| NB-1-2 | 19 | 19 | 2 | 58 | — | 2 | 59 | 0 |

TABLE 5

| | PP-1 [Parts by Mass] | PE-2 [Parts by Mass] | Acid-Modified PP [Parts by Mass] | F-1 (Non-Treated) [Parts by Mass] | F-2 (Hydrophobized) [Parts by Mass] | $C_{W2}$ [Mass %] | $C_{H2}$ [Mass %] |
|---|---|---|---|---|---|---|---|
| | across | | | Resin Composition B-2 | | | |

| | PP-1 [Parts by Mass] | PE-2 [Parts by Mass] | Acid-Modified PP [Parts by Mass] | F-1 (Non-Treated) [Parts by Mass] | F-2 (Hydrophobized) [Parts by Mass] | $C_{W2}$ [Mass %] | $C_{H2}$ [Mass %] |
|---|---|---|---|---|---|---|---|
| B-2-1 | 19 | 19 | 2 | 60 | — | 60 | 0 |
| B-2-2 | 24 | 24 | 2 | 50 | — | 50 | 0 |
| B-2-3 | 19 | 19 | 2 | 45 | 15 | 60 | 15 |
| B-2-4 | 38 | — | 2 | 60 | — | 60 | 0 |
| B-2-5 | 20 | 20 | — | 60 | — | 60 | 0 |
| NB-2-1 | 29 | 29 | 2 | 40 | — | 40 | 0 |
| NB-2-2 | 19 | 19 | 2 | 35 | 25 | 60 | 25 |

[Evaluation]

The following evaluations were carried out on the laminates of Examples and Comparative Examples.

<Drying Property of Ink>

The ink-jet printability was evaluated in terms of drying property of an ink.

A pictorial pattern of N5 in accordance with JIS X9201: 2001 (high-definition color digital standard image (CMYK/SCID)) was printed by ink-jet technique on the surface on the porous layer side of each of the laminates of Examples and Comparative Examples. A printer for aqueous pigmented ink-jet printing (model number: TM-C3500, manufactured by SEIKO EPSON CORPORATION) and aqueous cyan, magenta, yellow and black pigmented inks that were standard for that printer (item number: SJIC22) were used for printing.

The state of the ink on the printed image immediately after printing using the ink-jet printer was visually observed, and tissue paper was pressed against the printed image immediately after printing. The drying property of the ink was determined in the following manner.

<<Evaluation Criteria>>

A (Excellent): liquid ink was not found visually on the surface, and ink was not transferred to paper at all when the paper was even lightly pressed thereon.

B (Good): liquid ink was not found visually on the surface, but ink in a high-concentration moiety of the image was transferred to paper when the paper was pressed thereon.

C (Fair): liquid ink was not found visually on the surface, but ink in the whole image was transferred to paper when the paper was pressed thereon.

D (Poor): liquid ink was found visually on the surface.

<Generation of Gum Residues>

When the laminate was continuously produced in each of Examples and Comparative Examples, the thickness in the TD direction was measured once per hour at arbitrary twenty points.

If gum residues are generated, unevenness in the thickness is generated in the laminate.

Evaluation for gum residues was carried out based on the time when the unevenness in the thickness reaches ±3 μm or more, relative to the preset thickness of the sheet, after starting the operation.

<<Evaluation Criteria>>

A (Excellent): unevenness in the thickness was not generated even after operating for 24 hours.

B (Good): unevenness in the thickness was not generated after operating for 12 hours, but unevenness in the thickness was generated after operating for 24 hours.

C (Fair): unevenness in the thickness was not generated after operating for 8 hours, but unevenness in the thickness was generated after operating for 12 hours.

D (Poor): unevenness in the thickness was generated after operating for less than 8 hours.

The results of the evaluations described above are shown together in Table 6 below.

TABLE 6

| | First Porous Sub-Layer (B1) | | | Second Porous Sub-Layer (B2) | | | Formation-Supporting Layer (B3) | Liquid-Absorptive | Evaluations | |
|---|---|---|---|---|---|---|---|---|---|---|
| | Resin Composition | Grammage [g/m²] | Porosity [%] | Resin Composition | Grammage [g/m²] | Porosity [%] | Resin Composition | Capacity [cc/m²] | Drying Property | Gum Residues |
| Example 1 | B-1-1 | 2 | 40 | B-2-1 | 8 | 60 | B-3-1 | 18 | A | A |
| Example 2 | B-1-1 | 0.5 | 40 | B-2-1 | 8 | 60 | B-3-1 | 17 | A | B |
| Example 3 | B-1-1 | 10 | 40 | B-2-1 | 8 | 60 | B-3-1 | 22 | A | A |
| Example 4 | B-1-2 | 2 | 30 | B-2-1 | 8 | 60 | B-3-1 | 16 | B | A |
| Example 5 | B-1-3 | 2 | 50 | B-2-1 | 8 | 60 | B-3-1 | 19 | A | C |
| Example 6 | B-1-4 | 2 | 20 | B-2-1 | 8 | 60 | B-3-1 | 14 | B | A |
| Example 7 | B-1-5 | 2 | 20 | B-2-1 | 8 | 60 | B-3-1 | 14 | B | A |
| Example 8 | B-1-1 | 2 | 40 | B-2-1 | 4 | 60 | B-3-1 | 10 | C | A |
| Example 9 | B-1-1 | 2 | 40 | B-2-2 | 8 | 45 | B-3-1 | 12 | C | A |
| Example 10 | B-1-1 | 2 | 40 | B-2-3 | 8 | 50 | B-3-1 | 13 | B | A |
| Example 11 | B-1-1 | 2 | 40 | B-2-4 | 8 | 40 | B-3-1 | 11 | C | A |

TABLE 6-continued

| | First Porous Sub-Layer (B1) | | | Second Porous Sub-Layer (B2) | | | Formation-Supporting Layer (B3) | Liquid-Absorptive | Evaluations | |
|---|---|---|---|---|---|---|---|---|---|---|
| | Resin Composition | Grammage [g/m²] | Porosity [%] | Resin Composition | Grammage [g/m²] | Porosity [%] | Resin Composition | Capacity [cc/m²] | Drying Property | Gum Residues |
| Example 12 | B-1-1 | 2 | 40 | B-2-5 | 8 | 40 | B-3-1 | 11 | C | A |
| Example 13 | B-1-1 | 2 | 40 | B-2-1 | 8 | 60 | — | 18 | A | A |
| Comparative Example 1 | NB-1-1 | 2 | 15 | B-2-1 | 8 | 60 | B-3-1 | 8 | D | A |
| Comparative Example 2 | NB-1-2 | 2 | 55 | B-2-1 | 8 | 60 | B-3-1 | 19 | A | D |
| Comparative Example 3 | B-1-1 | 2 | 40 | NB-2-1 | 8 | 30 | B-3-1 | 6 | D | A |
| Comparative Example 4 | B-1-1 | 2 | 40 | NB-2-2 | 8 | 35 | B-3-1 | 9 | D | A |

In the case where a porous layer containing a filler in a large amount is produced, the problem of generation of gum resides arises; however, as clear from Examples described above, it was found that the present invention, in which the first porous sub-layer containing a filler having a hydrophobized surface in a predetermined amount is provided on the second porous sub-layer, can prevent generation of gum residues effectively while obtaining high drying property.

It was found that the present invention provides a laminate having a porous layer that can ensure the drying property of a printing ink and also can be produced with less gum residues generated.

Example 21

(Production of Substrate Layer (Film Uniaxially Stretched in Mechanical Direction))

Using an extruder set at 250° C., the above-described resin composition A-1 was melt-kneaded and then extruded into a sheet shape through a die, and the resultant was cooled to 70° C. using a cooler to thereby obtain a non-stretched monolayer film. The non-stretched film was reheated to 145° C. and then stretched 5 times in the mechanical direction by utilizing the difference in the circumferential speed between the rolls to thereby obtain a film uniaxially stretched in the mechanical direction.

(Production of Porous Layer (Stretched Bilayer Film))

19 parts by mass of high-crystalline polypropylene PP-1 (product name: MA3U, manufactured by Japan Polypropylene Corporation), being a propylene homopolymer, 19 parts by mass of high density polyethylene PE-2 (product name: NOVATEC HD HJ490, manufactured by Japan Polypropylene Corporation), 30 parts by mass of heavy calcium carbonate powder that had not undergone any surface treatment, F-1 (product name: SOFTON 1800, manufactured by BIHOKU FUNKA KOGYO CO., LTD.), 30 parts by mass of light calcium carbonate powder having a hydrophobized surface, F-2 (hydrophobized inorganic particles in Production Example 1), and 2.0 parts by mass of maleic acid-modified polypropylene (acid-modified PP) (product name: Modic P908, manufactured by Mitsubishi Chemical Corporation) were blended and stirred/mixed using a mixer to obtain a resin composition B-4-1 for forming a porous layer (B4).

Using an extruder set at 250° C., the above-described resin composition B-4-1 was melt-kneaded and then fed to an extrusion die. Then, it was extruded into a sheet shape, and the film derived from the resin composition B-4-1 was layered on one face of the above-described film uniaxially stretched in the mechanical direction to thereby obtain a laminate having a bilayer structure.

The resulting laminate was reheated to 160° C. in an oven and then stretched 9 times in the cross direction using a tenter. Then, the resultant was heat-treated at 170° C. to obtain a stretched film having a bilayer structure of biaxially stretched layer/uniaxially stretched layer, which was provided as the laminate including a thermoplastic resin film of Example 21. In the laminate of Example 21, the biaxially stretched layer derived from the resin composition A-1 was a substrate layer; and the uniaxially stretched layer derived from the resin composition B-4-1 was a porous layer (B4).

The laminate of Example 21 had a thickness of 83 μm. The substrate layer derived from the resin composition A-1 had a thickness of 58 μm and a grammage of 46 g/m². The porous layer (B4) derived from the resin composition B-4-1 had a thickness of 20 μm and a grammage of 10 g/m².

The materials composing the resin composition B-4-1 and the blending ratios of the materials (parts by mass) are shown in Table 7 and Table 8 below. The abbreviations in Table 8 are the same as those described in Table 7.

A fixing agent (product name: PAPYOGENE P-105, manufactured by SENKA corporation, a polymeric quarternary ammonium salt) and an antistatic agent (product name: SAFTOMER ST-3200, Mitsubishi Chemical Corporation) were mixed with each other in a mass ratio of 1:1 in terms of the solid content, and the resultant was diluted with water to obtain a coating liquid. The coating liquid was applied to the surface on the porous layer side of the laminate obtained above in Example 21 and dried at 105° C. using a hot air dryer to form a coating layer on the porous layer. The coating mass was 0.13 g/m² in terms of the solid content.

On the surface on the porous layer (B4) side of the laminate obtained, the liquid-absorptive capacity was measured and evaluated according to <Measurement of Liquid-Absorptive Capacity> described above.

Examples 22 to 24, Comparative Examples 21 to 30

The laminates including each thermoplastic resin film of Examples 22 to 24, Comparative Examples 21 to 30, were obtained in the same manner as in Example 21, except that the blending ratios of the materials in the resin compositions B-4-1 for the porous layer used in Example 21 were changed as shown in Table 8. Each of the laminates was a stretched film having a bilayer structure of biaxially stretched layer/ uniaxially stretched layer. In each of the laminates, the biaxially stretched layer was a substrate layer; and the uniaxially stretched layer was the porous layer (B4).

In Comparative Example 28, the resin composition contained no light calcium carbonate powder having a hydrophobized surface, F-2, and instead, 2 parts by mass of sodium laurate (manufactured by Wako Pure Chemical Corporation) was added. In Comparative Example 29, 30 parts by mass of calcium carbonate powder coated with a cationic polymer, F-3 (product name: AFF-95) as shown in Table 7 was added, instead of the light calcium carbonate powder having a hydrophobized surface, F-2.

TABLE 7

| Material | Abbreviation | Name | Contents |
| --- | --- | --- | --- |
| Thermoplastic Resin | PP-1 | Propylene Homopolymer | Product Name: MA3U, Manufactured by Japan Polypropylene Corporation MFR: 15 g/10 min (230° C., 2.16 kg Load), Melting Point: 167° C. (Peak Temperature in DSC) |
| | PE-2 | High Density Polyethylene | Product Name: NOVATEC HD HJ490, Manufactured by Japan Polypropylene Corporation MFR: 20 g/10 min (190° C., 2.16 kg Load), Melting Point: 133° C. (Peak Temperature in DSC), Density: 0.96 g/cm$^3$ |
| | Acid-Modified PP | Maleic Acid-Modified Polypropylene | Product Name: Modic P908, manufactured by Mitsubishi Chemical Corporation MFR: 45 g/10 min (230° C., 2.16 kg Load), Melting Point: 150° C. (Peak Temperature in DSC) |
| Non-Treated Filler | F-1 | Heavy Calcium Carbonate Powder | Product Name: SOFTON 1800, manufactured by BIHOKU FUNKA KOGYO CO., LTD. Average Particle Size: 1.25 μm (Air Permeability Method), Dried and Ground Product |
| Filler Having Hydrophobized Surface | F-2 | Calcium Carbonate Powder Treated with Sodium Laurate | Inorganic Particles Having Hydrophobized Surface in Production Example 1 |
| Filler Having Cationically Treated Surface | F-3 | Calcium Carbonate Powder Coated with Cationic Polymer | Product Name: AFF-95, manufactured by FIMATEC Ltd. Average Particle Size: 1.0 μm Heavy Calcium Carbonate Having Surface Coated with Water-Soluble Cationic Polymer |

TABLE 8

| | Resin Composition for Forming Porous Layer (B4) | | | | | | | | | | | | | |
| --- | --- | --- | --- | --- | --- | --- | --- | --- | --- | --- | --- | --- | --- | --- |
| | PP-1 [Parts by Mass] | PE-2 [Parts by Mass] | Acid-Modified PP [Parts by Mass] | F-1 (Non-Treated) [Parts by Mass] | F-2 (Hydrophobized) [Parts by Mass] | F-3 (Cationic) [Parts by Mass] | Sodium Laurate [Parts by Mass] | $C_W$ [Mass %] | $C_H$ [Mass %] | $4C_W/5$ [Mass %] | Grammage (g/m$^2$) | Liquid-Absorptive Capacity [cc/m$^2$] | Drying property | Gum Residues |
| Example 21 | 19 | 19 | 2 | 30 | 30 | — | — | 60 | 30 | 48 | 10 | 14 | B | B |
| Example 22 | 19 | 19 | 2 | 20 | 40 | — | — | 60 | 40 | 48 | 10 | 12 | C | A |
| Example 23 | 38 | — | 2 | 30 | 30 | — | — | 60 | 30 | 48 | 10 | 10 | C | B |
| Comparative Example 24 | 20 | 20 | — | 30 | 30 | — | — | 60 | 30 | 48 | 10 | 10 | C | B |
| Comparative Example 21 | 19 | 19 | 2 | 60 | — | — | — | 60 | 0 | 48 | 10 | 20 | A | D |
| Comparative Example 22 | 19 | 19 | 2 | — | 60 | — | — | 60 | 60 | 48 | 10 | 7 | D | A |
| Comparative Example 23 | 19 | 19 | 2 | 10 | 60 | — | — | 64 | 55 | 51 | 10 | 9 | D | C |
| Comparative Example 24 | 19 | 19 | 2 | — | 40 | — | — | 50 | 50 | 40 | 10 | 4 | D | A |
| Comparative Example 25 | 19 | 19 | 2 | 40 | — | — | — | 50 | 0 | 40 | 10 | 8 | D | B |
| Comparative Example 26 | 38 | — | 2 | — | 60 | — | — | 60 | 60 | 48 | 10 | 2 | D | A |
| Comparative Example 27 | 20 | 20 | — | — | 60 | — | — | 60 | 60 | 48 | 10 | 2 | D | A |
| Comparative Example 28 | 19 | 19 | 2 | 58 | — | — | 2 | 59 | 0 | 47 | 10 | 20 | A | D |

TABLE 8-continued

| | Resin Composition for Forming Porous Layer (B4) | | | | | | | | | | | | | |
|---|---|---|---|---|---|---|---|---|---|---|---|---|---|---|
| | PP-1 [Parts by Mass] | PE-2 [Parts by Mass] | Acid-Modified PP [Parts by Mass] | F-1 (Non-Treated) [Parts by Mass] | F-2 (Hydrophobized) [Parts by Mass] | F-3 (Cationic) [Parts by Mass] | Sodium Laurate [Parts by Mass] | $C_W$ [Mass %] | $C_H$ [Mass %] | $4C_W/5$ [Mass %] | Grammage (g/m²) | Liquid-Absorptive Capacity [cc/m²] | Drying property | Gum Residues |
| Comparative Example 29 | 19 | 19 | 2 | 30 | — | 30 | — | 60 | 0 | 34 | 10 | 18 | A | D |
| Comparative Example 30 | 9 | 9 | 2 | 50 | 30 | — | — | 80 | 30 | 64 | 10 | — | — | — |

[Evaluation]

For the laminates of Examples and Comparative Examples, evaluations of <Drying Property of Ink> and <Generation of Gum Residues> were carried out by the methods described hereinbefore.

The evaluation results are shown together in Table 8. In Comparative Example 30, granulation of pellets itself was impossible, and the above-described evaluations were thus impossible to carry out.

If a porous layer containing a filler in a large amount is produced, the problem of generation of gum resides arises; however, as clear from Examples described above, the porous layer according to the present invention was found to prevent generation of gum residues effectively even when a large amount of a filler is contained in the porous layer. Furthermore, the porous layer according to the present invention is excellent in drying property of a printing ink, as clear from Examples described above.

It was found that the present invention provides a laminate having a porous layer that can ensure the drying property of a printing ink and also can be produced with less gum residues generated.

The present application claims priority to Japanese patent application No. 2020-090316 filed on May 25, 2020 and Japanese patent application No. 2020-090469 filed on May 25, 2020, the disclosures of which are incorporated herein entirely by reference.

INDUSTRIAL APPLICABILITY

The laminate and the ink-jet printable paper having the laminate of the present invention are excellent in ink drying property when an aqueous pigmented ink is used, and accordingly, can be used for wide variety of applications, including business cards, leaflets, window films, POPs, and posters.

REFERENCE SIGNS LIST

1: thermoplastic resin film
A: substrate layer
B: porous layer
B1: first porous sub-layer
B2: second porous sub-layer
B3: formation-supporting layer
B4: porous layer (B4)

The invention claimed is:

1. A laminate comprising a substrate layer (A) and a porous layer (B), wherein
the porous layer (B) comprises a thermoplastic resin and a filler,
the filler comprises a filler having a hydrophobized surface, as a part thereof, and
the porous layer (B) has a liquid-absorptive capacity of 10 to 40 cc/m² as measured in accordance with JIS P 8140:1998 with a 70 mass % ethanol aqueous solution.

2. The laminate according to claim 1, wherein the filler having a hydrophobized surface is inorganic particles or organic particles having a surface treated with paraffin or a fatty acid having 12 to 22 carbon atoms or a salt thereof.

3. The laminate according to claim 1, wherein the porous layer (B) has a first porous sub-layer (B1) and a second porous sub-layer (B2),
the substrate layer (A), the second porous sub-layer (B2), and the first porous sub-layer (B1) are layered in this order,
a content of a whole of the filler in the first porous sub-layer (B1), $C_{W1}$ (mass %), and a content of the filler having a hydrophobized surface in the first porous sub-layer (B1), $C_{H1}$ (mass %), satisfy an expression (a1) and an expression (b1) below, and
a content of a whole of the filler in the second porous sub-layer (B2), $C_{W2}$ (mass %), and a content of the filler having a hydrophobized surface in the second porous sub-layer (B2), $C_{H2}$ (mass %), satisfy an expression (a2) and an expression (b2) below:

$$50 \leq C_{W1} \leq 75 \tag{a1}$$

$$30 \leq C_{H1} \leq 75 \tag{b1}$$

$$50 \leq C_{W2} \leq 75 \tag{a2}$$

$$0 \leq C_{H2} \leq 15 \tag{b2}.$$

4. The laminate according to claim 3, wherein the first porous sub-layer (B1) has a grammage of 0.5 to 10 g/m².

5. The laminate according to claim 3, wherein the second porous sub-layer (B2) has a grammage of 4 g/m² or more.

6. The laminate according to claim 3, wherein the thermoplastic resin contained in the porous layer (B) comprises a propylene-based polymer.

7. The laminate according to claim 6, wherein the thermoplastic resin contained in the porous layer (B) further comprises an ethylene-based polymer and an acid-modified polypropylene.

8. The laminate according to claim 3, wherein the porous layer (B) further has a formation-supporting layer (B3), and
the substrate layer (A), the formation-supporting layer (B3), the second porous sub-layer (B2), and the first porous sub-layer (B1) are layered in this order.

9. The laminate according to claim 1, wherein the porous layer (B) is a porous layer (B4) satisfying expressions (a4), (b4), and (c4) below:

$$50 < C_W \leq 75 \quad (a4)$$

$$30 \leq C_H \quad (b4)$$

$$C_H \leq 4C_W/5 \quad (c4)$$

wherein $C_W$ represents a content (mass %) of a whole of the filler in the porous layer (B4), and $C_H$ represents a content (mass %) of the filler having a hydrophobized surface in the porous layer (B4).

10. The laminate according to claim 9, wherein the thermoplastic resin contained in the porous layer (B4) comprises a propylene-based polymer.

11. The laminate according to claim 9, wherein the thermoplastic resin contained in the porous layer (B4) further comprises an ethylene-based polymer and an acid-modified polypropylene.

12. The laminate according to claim 1, wherein the porous layer (B) is a layer formed through an extrusion process.

13. The laminate according to claim 1, wherein the laminate has a coating layer comprising a cationic polymer on a surface of the porous layer (B).

14. Ink jet printable paper comprising the laminate according to claim 1.

* * * * *